US012664034B2

(12) United States Patent
Wiesner

(10) Patent No.: US 12,664,034 B2
(45) Date of Patent: Jun. 23, 2026

(54) UPGRADE-SAFE EXTENSIBLE SOFTWARE-AS-A-SERVICE PLATFORM

(71) Applicant: Oracle International Corporation, Redwood Shores, CA (US)

(72) Inventor: Florian Wiesner, Munich (DE)

(73) Assignee: Oracle International Corporation, Redwood Shores, CA (US)

( * ) Notice: Subject to any disclaimer, the term of this patent is extended or adjusted under 35 U.S.C. 154(b) by 570 days.

(21) Appl. No.: 18/194,192

(22) Filed: Mar. 31, 2023

(65) Prior Publication Data

US 2024/0330088 A1 Oct. 3, 2024

(51) Int. Cl.
G06F 9/54 (2006.01)
G06F 8/65 (2018.01)

(52) U.S. Cl.
CPC ............... G06F 9/547 (2013.01); G06F 8/65 (2013.01)

(58) Field of Classification Search
None
See application file for complete search history.

(56) References Cited

U.S. PATENT DOCUMENTS

2010/0005443 A1 * 1/2010 Kwok .................... G06Q 10/10
717/100
2017/0083378 A1 * 3/2017 Bishop .................. G06F 9/5038

| | | | | |
|---|---|---|---|---|
| 2018/0278725 A1 * | 9/2018 | Thayer | .................... | H04L 69/22 |
| 2019/0012369 A1 * | 1/2019 | Ducott | .............. | G06F 16/24552 |
| 2020/0334244 A1 * | 10/2020 | Hammerschmidt | .... | G06F 16/86 |
| 2020/0379970 A1 * | 12/2020 | Vasilevskiy | ......... | G06F 16/2291 |
| 2021/0081698 A1 * | 3/2021 | Lindeman | .......... | G06Q 30/0283 |
| 2021/0089357 A1 * | 3/2021 | Garaga | .................. | G06F 16/23 |
| 2022/0086218 A1 * | 3/2022 | Sabella | ................. | H04M 15/66 |
| 2023/0205678 A1 * | 6/2023 | Bollepally | .............. | G06F 9/547 717/124 |
| 2023/0359513 A1 * | 11/2023 | Tummala | .............. | G06F 9/5005 |
| 2024/0061723 A1 * | 2/2024 | Gupta | ................. | G06F 11/3423 |
| 2025/0190352 A1 * | 6/2025 | Lepera | .................. | G06N 20/00 |

* cited by examiner

*Primary Examiner* — Lewis A Bullock, Jr.
*Assistant Examiner* — Christian M Bakhit
(74) *Attorney, Agent, or Firm* — Invoke

(57) ABSTRACT

Techniques for operating an upgrade-safe, extensible software-as-a-service (SaaS) platform are disclosed, including: receiving, by the SaaS platform, an application programming interface (API) request associated with a tenant of the SaaS platform; determining, by the SaaS platform, that the API request includes a tenant-specific type that extends a built-in type of the SaaS platform; responsive to determining that the API request includes the tenant-specific type: executing, by the SaaS platform, a mapper stack including at least (a) a first type-mapper associated with the built-in type of the SaaS platform and (b) a second type-mapper associated with the tenant-specific type; transmitting, by the SaaS platform, output of the mapper stack in response to the API request.

17 Claims, 14 Drawing Sheets

Figure 8:
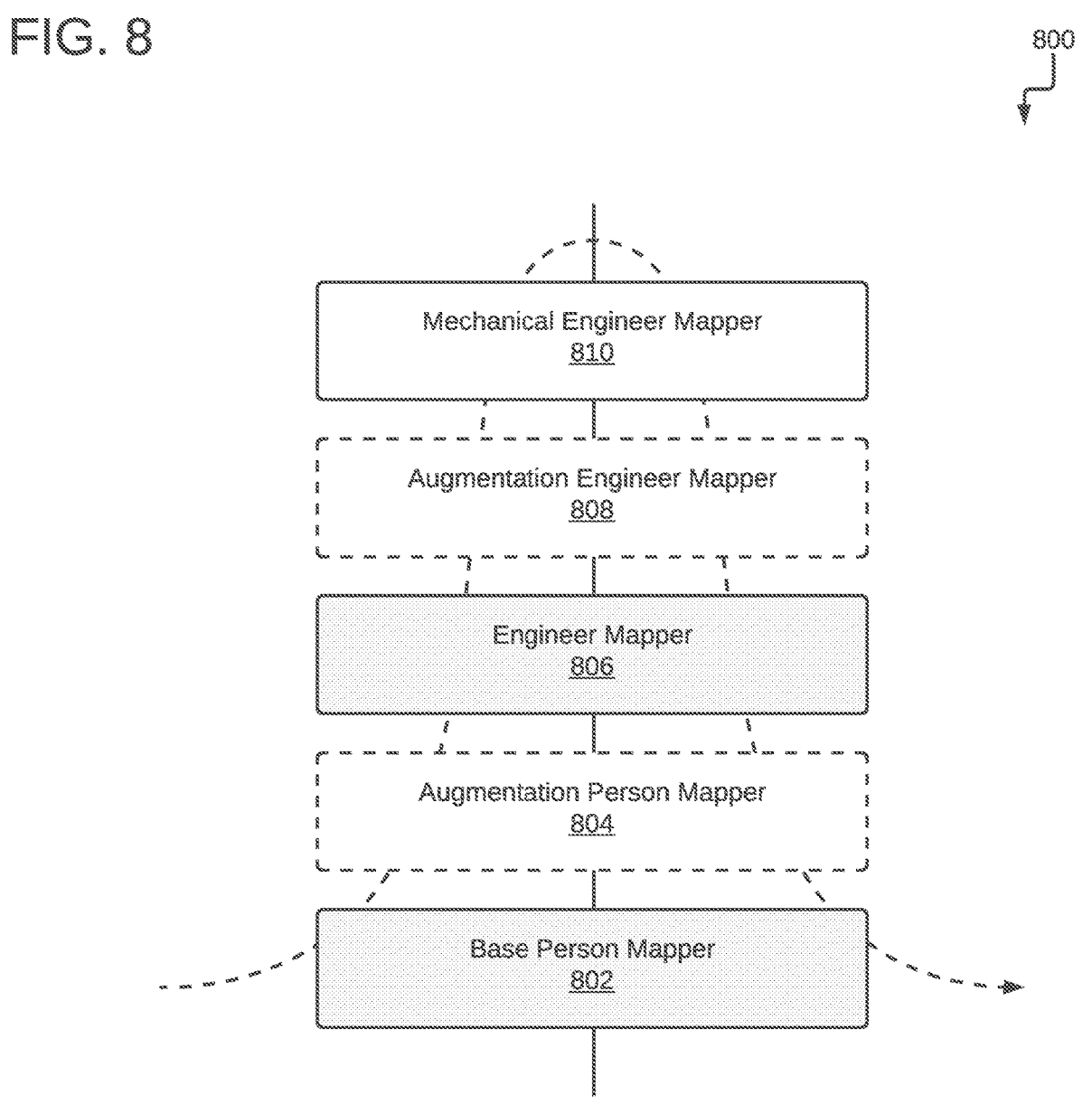

Mechanical Engineer Mapper
810

Augmentation Engineer Mapper
808

Engineer Mapper
806

Augmentation Person Mapper
804

Base Person Mapper
802

Generate a matrix with signal definitions on both dimensions
1202

Determine signal reachability within potential tasks
1204

Populate each cell in the matrix with the set of legitimate transitioning mappers
1206

Encounter awaiting signal
1208

Use the matrix to determine whether the signal is reachable
1210

UPGRADE-SAFE EXTENSIBLE SOFTWARE-AS-A-SERVICE PLATFORM

TECHNICAL FIELD

The present disclosure relates to software-as-a-service (SaaS). In particular, the present disclosure relates to extensible SaaS platforms.

BACKGROUND

Software-as-a-Service (SaaS) is a cloud-based software delivery model where software applications are hosted and provided to customers as a service over the Internet. Instead of installing and running software on their own servers or computers, users (also referred to as tenants) can access the software through a web browser or mobile application.

To integrate two or more applications and/or services, some approaches use integration templates for each point of integration. A vendor releases a particular version of an integration template, and users can develop and deploy custom integrations using those templates. When a new version of an integration template is released (for example, to accommodate an upgrade in one of the integrated applications and/or services), users may need to reapply and/or reimplement their customizations. A new version of the integration template may break one or more existing customizations.

Breaking customizations is particularly troublesome for SaaS integrations. With self-hosted software, the user controls whether and when to upgrade the software and thereby any integrations that rely on that software. In contrast, SaaS release/upgrade cycles are not under tenant control. New SaaS versions may be rolled out without warning and/or without any option to opt out of the upgrade. The more SaaS services that are integrated together, the greater the risk of the integration breaking due to an upgrade to one of those services. Tenants are forced to be accountable for regularly reapplying and reimplementing their respective customizations. In some cases, there may be relatively little time between adapting to one upgrade and needing to attend to another upgrade that was automatically rolled out.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment and mean at least one. In the drawings:

FIG. 8 illustrates an example of a mapper execution stack in accordance with one or more embodiments;

DETAILED DESCRIPTION

Figure 1:
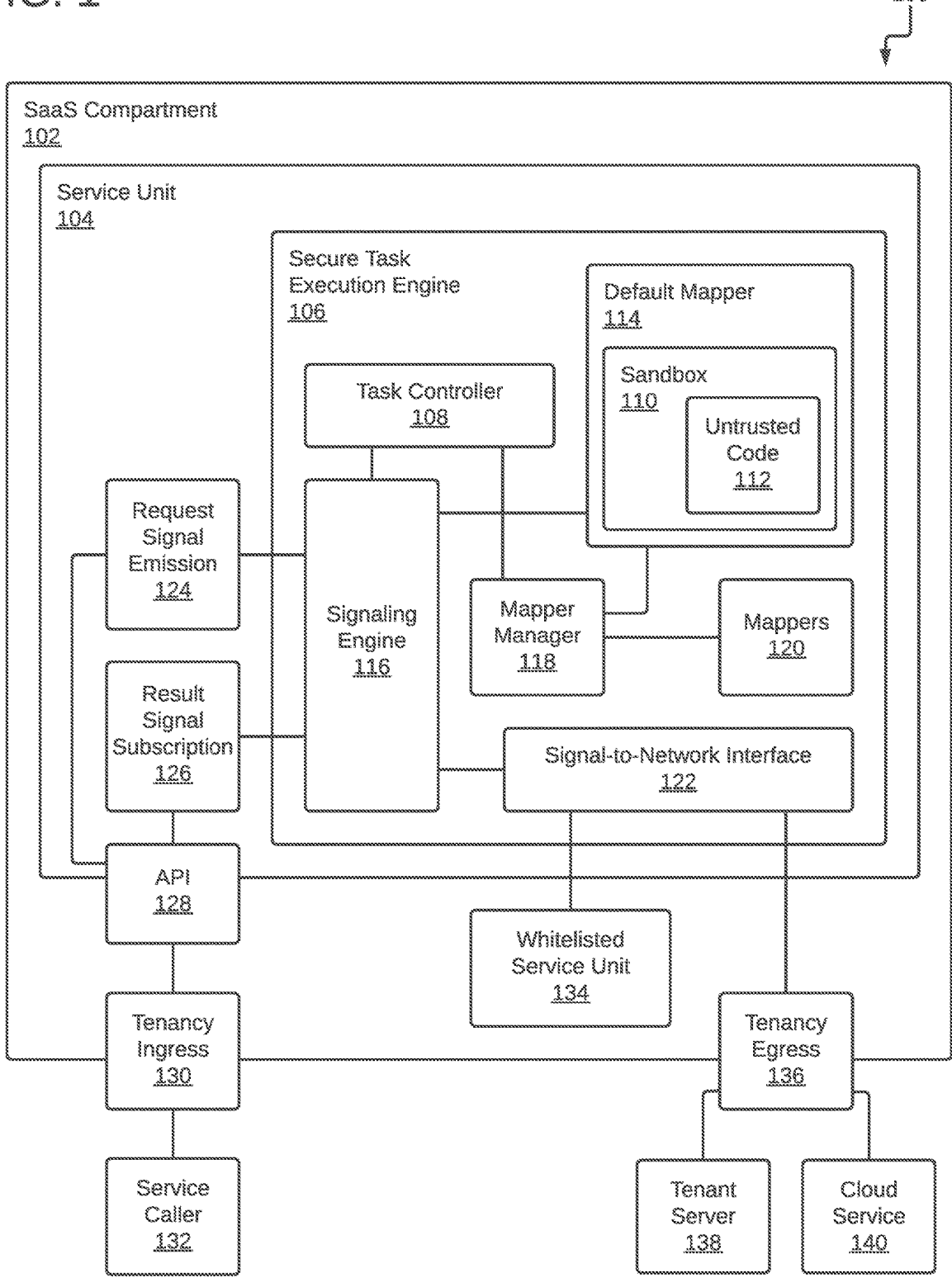
FIG. 1 shows a block diagram that illustrates an example of a system in accordance with one or more embodiments.

In the following description, for the purposes of explanation and to provide a thorough understanding, numerous specific details are set forth. One or more embodiments may be practiced without these specific details. Features described in one embodiment may be combined with features described in a different embodiment. In some examples, well-known structures and devices are described with reference to a block diagram form, in order to avoid unnecessarily obscuring the present invention.

The following table of contents is provided for reference purposes only and should not be construed as limiting the scope of one or more embodiments.

1. GENERAL OVERVIEW
2. EXAMPLE SYSTEM
   2.1. SYSTEM COMPONENTS
   2.2. DATA STORAGE
   2.3. USER INTERFACE
   2.4. TENANTS
3. DATA MODEL
4. HANDLING API REQUESTS
5. MAPPER EXECUTION
6. TASK FLOWS
7. MAPPER CONTROL FLOWS
   7.1. SINGLE MAPPER
   7.2. MULTIPLE MAPPERS
8. SIGNALING
   8.1. SIGNAL DEFINITIONS
   8.2. CREATING TASKS FROM SIGNALS
   8.2.1. CREATING A MAPPER STACK FOR FROM-MODEL TASKS
   8.2.2. CREATING A MAPPER STACK FOR TO-MODEL TASKS
   8.3. USING SIGNALS FOR COLLABORATION
   8.3.1. EMISSION AND SUBSCRIPTION
   8.3.2. REACTIVE AWAIT OF SIGNALS AND SIGNAL COLLECTIONS
   8.3.3. REFERENCE STATE MACHINE FOR MAPPERS
   8.4. SIGNAL REACHABILITY
   8.4.1. TRANSITIVE REACHABILITY
   8.4.2. DETERMINING SIGNAL REACHABILITY
   8.4.3. SIGNAL SCOPE
9. COMPUTER NETWORKS AND CLOUD NETWORKS
10. MICROSERVICE APPLICATIONS 10.1. TRIGGERS
10.2. ACTIONS
11. HARDWARE OVERVIEW
12. MISCELLANEOUS; EXTENSIONS

1. General Overview

In an embodiment, an upgrade-safe, extensible SaaS platform supports tenant customizations without requiring those customizations to be reapplied and/or reimplemented with each SaaS upgrade. Instead of mandatory, monolithic integration templates, one or more embodiments use signaling and task control to invoke the relevant mapper(s) for each application programming interface (API) request to the platform. While some tenants may use the SaaS platform only in its provided configuration, one or more base type-mappers built into the platform may optionally be supplemented via extension hooks, allowing for tenant customizations independent of the base type-mapper(s). Specifically, integrations may be deployed as microservices across multiple SaaS tenants, with each tenant having the option to customize those integrations via the extension hooks. The SaaS platform provider may retain control over the base integration(s), while each tenant retains control over their respective customizations that remain valid even if a base integration changes.

A business contract between the SaaS provider and tenants may further help ensure that maintenance changes and new features at the platform level do not alter the base type-mapper(s) in ways that would break the tenant customizations. To alter the base type-mapper(s) in such a way may require renegotiation of the contract, allowing the tenants sufficient time to absorb the change(s) into their respective customizations.

One or more embodiments described in this Specification and/or recited in the claims may not be included in this General Overview section.

2. Example System

2.1. System Components

FIG. 1 illustrates an example of a system 100 in accordance with one or more embodiments. As illustrated in FIG. 1, the system 100 includes various components. Each of these components is described in further detail below. Collectively, at least a subset of the components illustrated in FIG. 1 form an upgrade-safe, extensible SaaS platform.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in the section titled "Computer Networks and Cloud Networks."

In an embodiment, the system 100 includes a SaaS compartment 102. A SaaS compartment 102 is a virtual environment or a logically isolated container in a cloud-based infrastructure that hosts a specific SaaS application or service. A SaaS compartment 102 is configured to provide secure and scalable infrastructure to run a SaaS application or service, in which one tenant's data and resources are isolated from the data and resources of other tenants, thereby ensuring better security and privacy. In some instances, a SaaS compartment 102 may store highly confidential tenant-specific components, such as sensitive enterprise data.

In an embodiment, the system 100 includes a service unit 104. A service unit 104 is a set of hardware and/or software that performs one or more particular functions. The service unit 104 may perform one or more functions that are part of a larger, integrated SaaS solution, in which the service unit 104 supplies one or more units of the total functionality. For example, the service unit 104 may include a particular microservice in a chain or recipe of microservices.

In an embodiment, the system includes a secure task execution engine 106, also referred to herein as a task engine. The task engine 106 is configured to generate and execute tasks, some examples of which are described herein. Specifically, the task engine 106 includes a task controller 108, which is configured to initiate tasks responsive to signals from a signaling engine 116. The task engine 108 may be configured to initiate mapping tasks, via a mapper manager 118, as described in further detail herein.

In an embodiment, a sandbox 110 is a logically isolated execution environment that allows for the execution of untrusted code 112, i.e., tenant-supplied code that may not be fully trusted not to contain malicious and/or malformed instructions. The sandbox 110 helps ensure that each tenant's environment is isolated from other tenants' untrusted code 112. The sandbox 110 further protects the service unit 104 from faulty tenant-provided code that may, for example, consume inordinate amounts of compute resources and/or fail to terminate due to a programming error (e.g., an endless loop).

In an embodiment, the sandbox 110 is hosted by a default mapper 114. The default mapper 114 is a mapper, provided by the SaaS platform, that is configured to perform the tenant-specific operations executed in the sandbox 110. Untrusted code 112 may be specific to one or more tenant-defined type(s) and/or may perform augmentation of SaaS-provided base type-mapping.

In an embodiment, a mapper manager 118 refers to hardware and/or software configured to perform operations for managing mapper execution, including control flow across mapper stacks, as described in further detail herein.

In an embodiment, the system 100 includes one or more mappers 120. The mappers 120 may include one or more base type-mappers supplied by the SaaS platform, zero or more tenant-supplied augmentation mappers that augment the base type-mappers, and/or zero or more tenant-supplied mappers for additional types not already supplied by the SaaS platform.

In an embodiment, the system 100 includes a signal-to-network interface 122. The signal-to-network interface 122 supports secure communication between the task engine 106 and external resources. For example, the signal-to-network interface 122 may support secure communication with a whitelisted service unit 134. The whitelisted service unit 134 may be, for example, a microservice in a chain or recipe of microservices. The signal-to-network interface 122 may also be configured to translate between data formats used by the task engine 106 and the whitelisted service unit 134.

As described in further detail herein, in an embodiment, the system 100 uses signaling to generate and process tasks, including mapping functions. The system 100 may include request signal emission 124 configured to emit signals to the task engine 106 responsive to tenant calls to the service unit 104's API 128. Alternatively or additionally, the system 100 may include result signal subscription 126 configured to subscribe to singular or collection output signals and return the results to the tenant via the API 128. The API 128 may include a representational state transfer (REST) interface and/or another kind of interface that provides endpoints for communicating via a tenancy ingress 130, i.e., a logical point of ingress for a service caller 132 (e.g., a tenant-controlled process) to access functions within the SaaS compartment 102 and receive the results of those functions.

In an embodiment, the system 100 includes a tenancy egress 136. The tenancy egress 136 provides a logical point of egress from the SaaS compartment 102, through which the task engine 106 can communicate with external resources such as a tenant server 138 (e.g., an application server executing in a tenant-controlled environment) and/or another cloud service 140 (e.g., a storage service or other kind of cloud-based service).

In one or more embodiments, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

2.2. Data Storage

One or more embodiments may store data in a data repository (not shown). A data repository is any type of storage unit and/or device (e.g., a file system, database, collection of tables, and/or any other storage mechanism) for storing data. For example, a data repository may be configured to store mappers 120, untrusted code 112, etc.

A data repository may include multiple different storage units and/or devices. The multiple different storage units and/or devices may or may not be of the same type or located at the same physical site. A data repository may be implemented or executed on the same computing system as a SaaS compartment 102 and/or on a computing system separate from the SaaS compartment 102. The data repository may be communicatively coupled to a SaaS compartment 102 via a direct connection or via a network.

2.3. User Interface

One or more embodiments include an interface (not shown). An interface refers to hardware and/or software configured to facilitate communications between a user and one or more components of the system 100. The interface renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms. Different components of the interface may be specified in different languages. For example, the behavior of user interface elements may be specified in a dynamic programming language, such as JavaScript. The content of user interface elements may be specified in a markup language, such as hypertext markup language (HTML) or XML User Interface Language (XUL). The layout of user interface elements may be specified in a style sheet language, such as Cascading Style Sheets (CSS). Alternatively, the interface may be specified in one or more other languages, such as Java, Python, C, or C++.

2.4. Tenants

In one or more embodiments, a tenant is a corporation, organization, enterprise, or other entity that accesses a shared computing resource, such as the system 100. The system 100 may include multiple tenants that are independent from each other, such that a business or operation of one tenant is separate from a business or operation of another tenant. Some examples of multi-tenant architectures in accordance with one or more embodiments are described in further detail below.

3. Data Model

Figure 2:
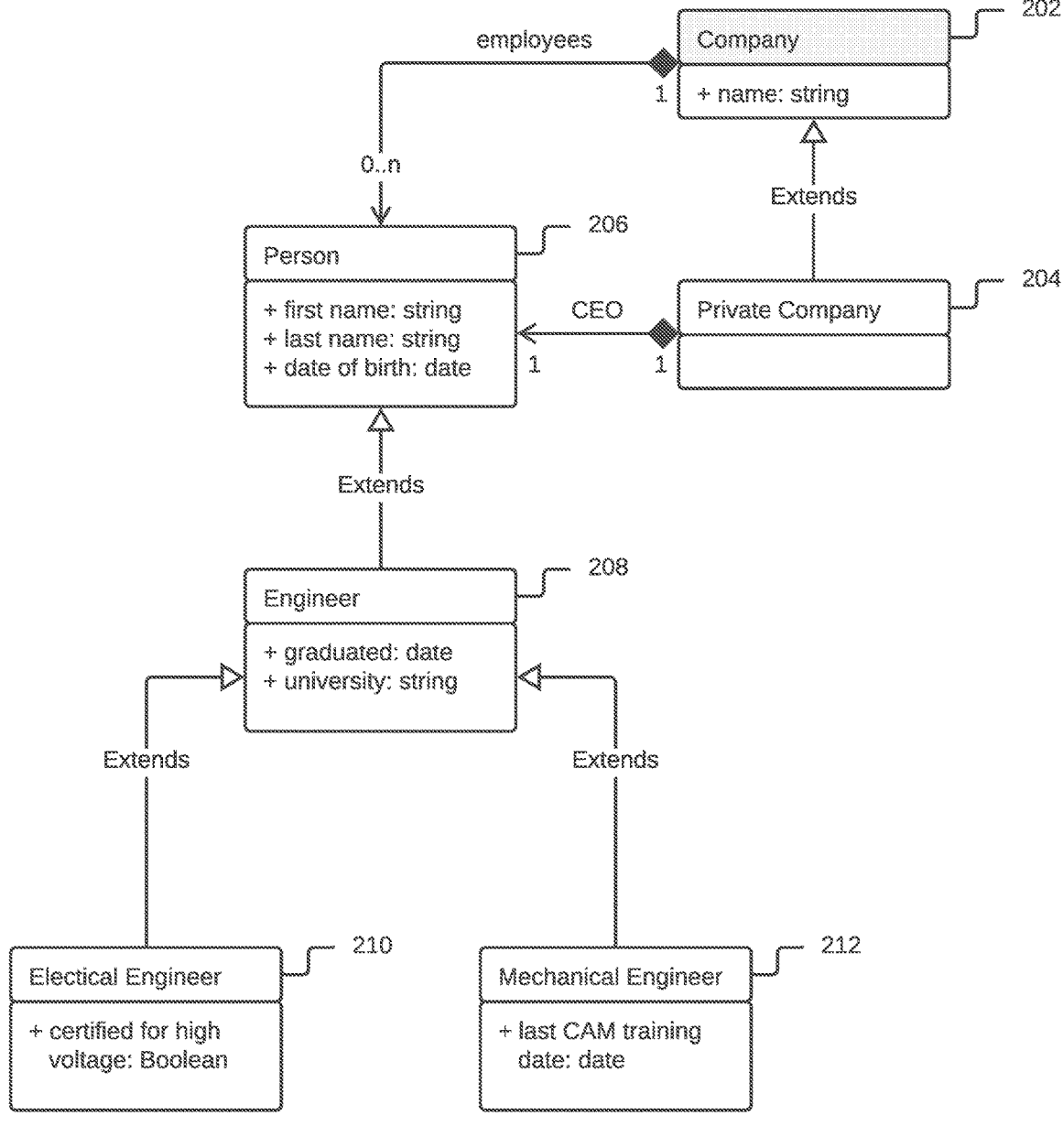
FIG. 2 shows a block diagram that illustrates an example of a data model in accordance with one or more embodiments.

FIG. 2 shows a block diagram that illustrates an example of a data model in accordance with one or more embodiments. Components and/or operations described below should be understood as one specific example which may not be applicable to certain embodiments. Accordingly, components and/or operations described below should not be construed as limiting the scope of any of the claims.

Specifically, the example illustrated in FIG. 2 includes a company base type 202 and a person base type 206. Each instance of a company 202 includes one or more employees, each of which is a respective instance of a person 206. A private company type 204 extends the company base type 202. Each instance of a private company 204 further includes a chief executive officer (CEO), also an instance of a person 206. An engineer type 208 extends the person base type 206. An electrical engineer type 210 and a mechanical engineer type 212 each further extend the engineer type 208.

In an embodiment, each supported base or extension type may have an associated mapper that is part of a mapper stack. For example, a mapper stack for the electrical engineer extension type 210 may include a mapper specific to the electrical engineer extension type 210, a mapper specific to the engineer extension type 208, and a mapper for the person base type 206. An example of executing a mapper stack is discussed in further detail below.

4. Handling Api Requests

In an embodiment, handling an API request spawns a starter set of mapping tasks for the request in the task engine. As described below, a request without a payload may result in a single start task, while a payload-based request may spawn one or more tasks for each individually extensible structured type (e.g., class, JavaScript Object Notation (JSON) object, XMLSchema complex element, etc.) in the payload.

A single task created based on a non-payload-based request may be of a generic type, while tasks created based on payload items may have types that are dictated by the platform's API model. In the example illustrated in FIG. 2, a payload-based request for a generic company with n employees may result in n+1 tasks (one for the company plus one for each of the n employees), while a payload-based request for a private company with m employees may result in m+2 tasks (one for the company, one for the CEO, and one for each of the m employees).

Figure 3:
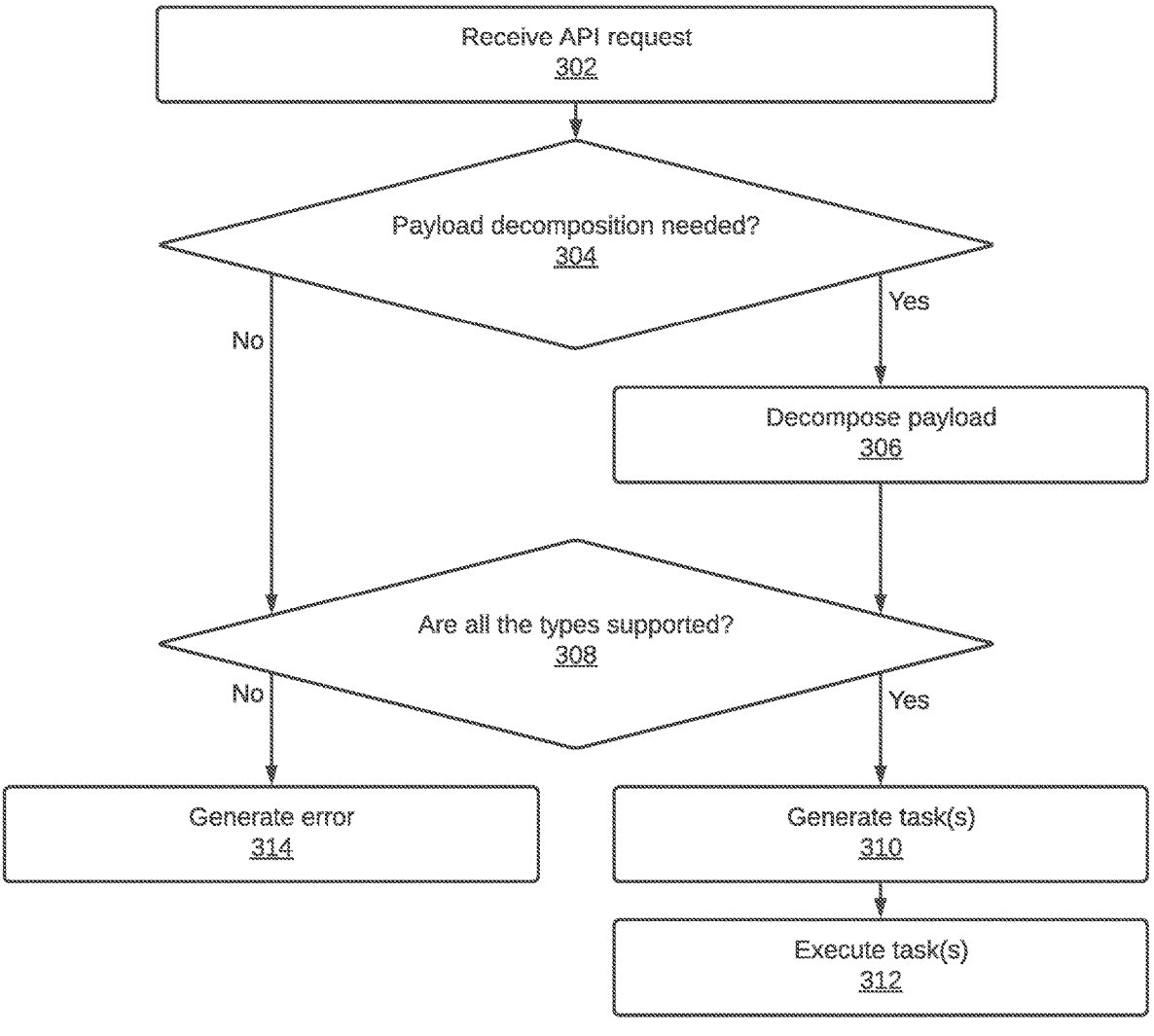
FIG. 3 illustrates an example set of operations for handling API requests in accordance with one or more embodiments.

FIG. 3 illustrates an example set of operations for handling API requests in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments. In the following discussion, the term "platform" refers to an upgrade-safe, extensible SaaS platform as described herein.

In an embodiment, the platform receives an API request (Operation 302). For example, the platform may receive an API request via a tenancy ingress as illustrated in FIG. 1. An API request from a caller may be emitted directly to the signaling engine. Alternatively, some payload-based requests may require decomposition, as described below. For example, a REST interface may support GET, DELETE, and HEAD, each of which trigger a direct signal. The REST interface may also support POST. PUT, and PATCH, each of which may trigger payload decomposition. The platform may determine whether payload decomposition is needed (Operation 304), for example, based on the kind of request received and/or one or more properties of any payload included in the request. If payload decomposition is needed, then the platform decomposes the payload (Operation 306).

In some cases, the platform may not support all types, which may be a prerequisite for creating the initial set of tasks required to handle the API request. In the example of FIG. 2, multiple APIs and/or API implementations may use a common data model that includes electrical engineers and mechanical engineers. However, one service unit may support only electrical engineers and another service unit may support only mechanical engineers. In this case, the former service unit supports API requests that include person records, engineer records, and/or electrical engineer records; the latter service unit supports API requests that include person records, engineer records, and/or mechanical engineer records. (This example assumes that the former service unit does not include any tenant-specific extension that introduces additional support for mechanical engineers.) The platform may determine whether all the necessary types indicated by the API request are supported. If any of the types are not supported, the platform may generate an error (Operation 314). For example, the platform may return an error message to the caller, responsive to the API request.

If all the types are supported, then the platform generates the necessary task(s) (Operation 310). For a non-payload-based request, the platform may generate a single generic task. For a payload-based request, the platform may generate tasks corresponding to each structured type in the payload (Operation 310). The platform proceeds to execute the task(s) (Operation 312) corresponding to the API request, as described in further detail herein. For a payload-based request, the platform may start the initial task(s) only once all tasks have been successfully created, ensuring that the overall payload can be processed.

5. Mapper Execution

Figure 4:
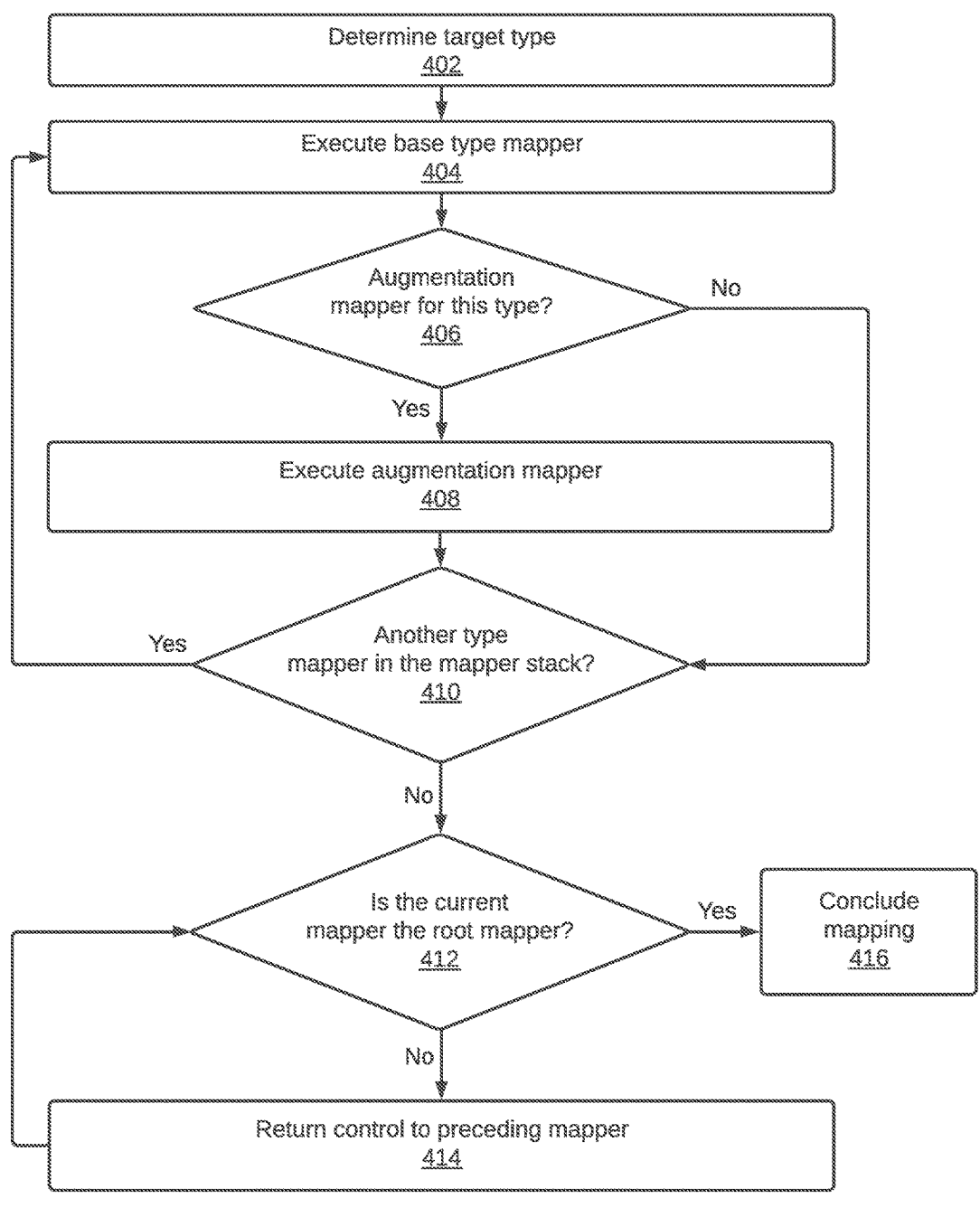
FIG. 4 illustrates an example set of operations for executing mappers in accordance with one or more embodiments.

FIG. 4 illustrates an example set of operations for executing mappers in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments. In the following discussion, the term "platform" refers to an upgrade-safe, extensible SaaS platform as described herein.

In an embodiment, the platform determines the target type (Operation 402), i.e., the most-specific type applicable to the given input. Using the example of FIG. 2, electrical engineer is a more specific type than engineer, which in turn is a more specific type than person. The platform may determine the target type by analyzing the fields in the given object and determining the best fit for those fields. Continuing with the example of FIG. 2, an object that includes a "certified for high voltage" field must have a target type of electrical engineer, since that field is not present in any of the other types. Alternatively or additionally, the object may include a label (e.g., a string value and/or another kind of label) that indicates the target type. Based on the target type, the platform can determine the full mapper stack applicable to that object.

To begin mapping, the platform executes the base type-mapper (Operation 404) for the most generic type (e.g., person) in the mapper stack. After executing the base type-mapper, the platform determines whether an augmentation mapper exists for this type (Operation 406). If an augmentation manager does exist, the platform executes the augmentation mapper (Operation 408). After executing the augmentation mapper, or if no augmentation mapper exists for this type, the platform determines whether the mapper stack includes another type-mapper for the next immediate inheritor in the type hierarchy (Operation 410). Continuing the example of FIG. 2, the next type-mapper would be the type-mapper for the engineer type. If another type-mapper exists in the stack, the platform executes that type-mapper (Operation 404), followed by any corresponding augmentation mapper (Operation 408). This process iterates until there are no more type-mappers in the mapper stack.

Once all type-mappers and corresponding augmentation mappers have been executed, the platform determines whether the current mapper is the root mapper, i.e., the first type-mapper that was executed (Operation 412). If the current mapper is not the root mapper, then the platform returns control to the preceding mapper (Operation 414), and so on until the current mapper is the root mapper. This process of returning control allows each mapper to perform any clean-up or other follow-up actions before ceding control down the stack. Mapping concludes (Operation 416) after returning control to the root mapper and receiving confirmation that the root mapper has completed operations.

6. Task Flows

Figure 5:
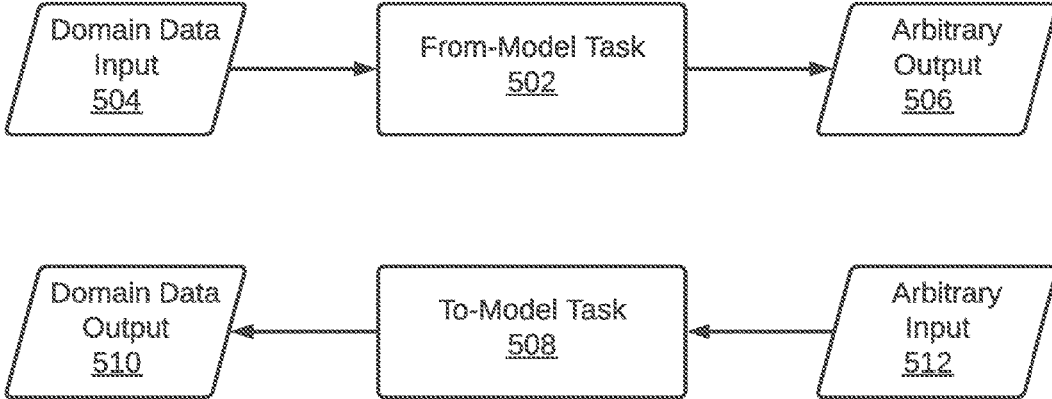
FIG. 5 illustrates an example of task flows in accordance with one or more embodiments.

FIG. 5 illustrates an example of task flows in accordance with one or more embodiments. Components and/or operations described below should be understood as one specific example which may not be applicable to certain embodiments. Accordingly, components and/or operations described below should not be construed as limiting the scope of any of the claims.

In an embodiment, the platform supports multiple categories of tasks, which may include one or more of from-model tasks, to-model tasks, and/or generic tasks. Here, the terms "from" and "to" refer to whether the input ("from") or output ("to") conforms to a domain data model such as that illustrated in FIG. 2. In an embodiment, payload-based and state-based API requests typically start with from-model tasks and generate responses via to-model tasks.

Specifically, as illustrated in FIG. 5, a from-model task 502 supports domain data input 504, i.e., input that conforms to a domain data model. The from-model task 502 may be configured to produce arbitrary output 506, i.e., output that is not required to adhere to any particular data model. Conversely, a to-model task 508 supports arbitrary input 512, i.e., input that is not required to conform to any particular data model. The to-model task 508 may be configured to produce domain data output 510, i.e., output that conforms to a domain data model. A generic task (not shown in FIG. 6) supports arbitrary input and is configured to produce arbitrary output.

In an embodiment, from-model and to-model tasks each have a controlled model-format side and an uncontrolled arbitrary-format side. The model-format side allows for interaction patterns defined according to the domain model, while the arbitrary-format side does not.

7. Mapper Control Flows

In an embodiment, mappers follow a fixed protocol to interact with each other, within the scope of a task. Given n participating parties jointly using the platform to implement upgrade-safe integrations, each party is free to mutate its own parts (i.e., the tenant-owned mappers) with little-to-no impact on the other parties. Conceptually, each type or type extension has exactly one owner Om, with $0 < m <= n$. Each type must have a corresponding mapper $M_m$ and may optionally have additional mappers $\{M_k | m < k <= n\}$. When an applicable extension exists for a type, the extension has its own owner and one or more mappers, and the base type-mappers for each extension type may be mandatory.

When a task starts executing, each mapper may perform operations such as payload mapping and enrichment. For example, a mapper may obtain enrichment data from ad hoc calculations, such as calculations based on the current date, calls to external services via a signal-to-network interface, ingesting arbitrary signal data from other sources, etc. Each mapper may further inform the platform when to call the next mapper and/or when to return control to the current mapper. Thus, the platform invokes each mapper by effectively traversing a mapper stack from the broadest base type-mapper up to the most significant extension type-mapper and then returning control by traversing the stack again in the opposite direction. An example of a mapper stack is described in further detail below.

7.1. Single Mapper

Figure 6:
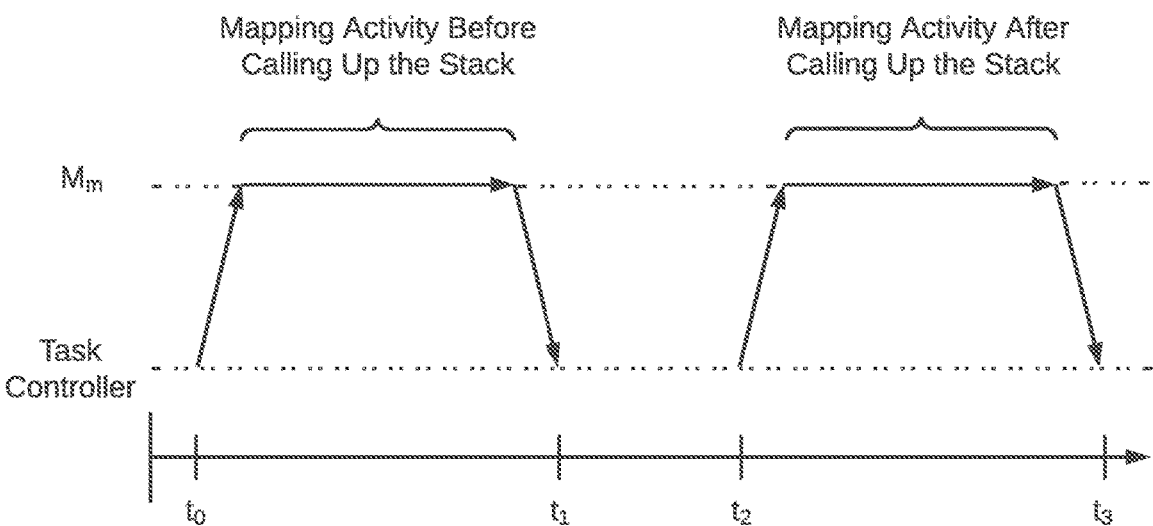
FIG. 6 illustrates an example of control flow for a single mapper accordance with one or more embodiments.

FIG. 6 illustrates an example of control flow for a single mapper accordance with one or more embodiments. Components and/or operations described below should be understood as one specific example which may not be applicable to certain embodiments. Accordingly, components and/or operations described below should not be construed as limiting the scope of any of the claims.

In an embodiment, a mapper can perform activity both before and after control passes up the mapper stack. In the example of FIG. 6, a task controller calls mapper $M_m$ at time $t_0$. From time $t_0$ to time $t_1$, mapper $M_m$ performs any mapping activities that are intended to be effective before invoking any subsequent mappers for the task. At time $t_1$, mapper $M_m$ informs the task engine that it has completed its initial activities. Mapper $M_m$ does not need to know whether any subsequent mappers exist in the mapper stack.

From time $t_1$ to time $t_2$, mapper $M_m$ is idle while extension mappers (if any) execute. This time period may be very short, if no further mappers are applicable. At time $t_2$, after all mappers for the same type and any applicable extension mappers have completed execution, flow control returns to mapper $M_m$. At time $t_3$, mapper $M_m$ confirms its completion, after having performed all after-return activities. The task is complete once all mappers in the task have reached $t_3$.

7.2. Multiple Mappers

Figure 7:
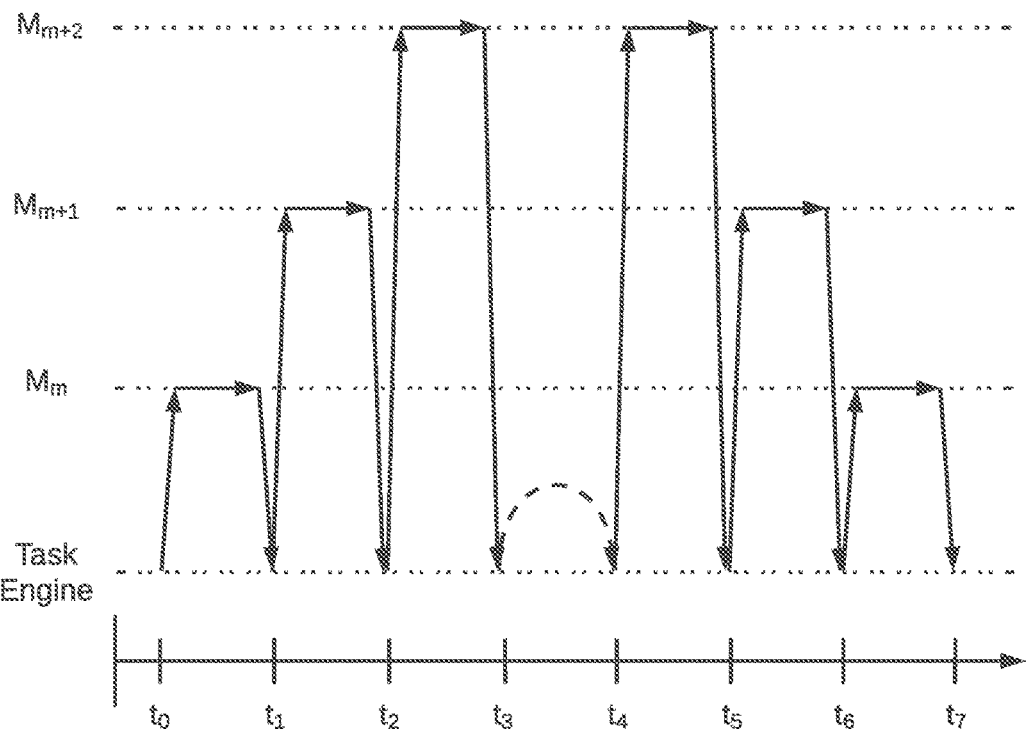
FIG. 7 illustrates an example of control flow for multiple mappers in accordance with one or more embodiments.

FIG. 7 illustrates an example of control flow for multiple mappers in accordance with one or more embodiments. Components and/or operations described below should be understood as one specific example which may not be applicable to certain embodiments. Accordingly, components and/or operations described below should not be construed as limiting the scope of any of the claims.

Specifically, FIG. 7 illustrates an example of control flow for three mappers $M_m$, $M_{m+1}$, and $M_{m+2}$:

At time $t_0$, mapper $M_m$ begins its processing.

At time $t_1$, mapper $M_m$ completes its pre-extensions execution phase and hibernates. The task engine passes control to mapper $M_{m+1}$, which starts its processing.

At time $t_2$, mapper $M_{m+1}$ completes its pre-extensions execution phase and hibernates. The task engine passes control to mapper $M_{m+2}$, which starts its processing.

At time $t_3$, mapper $M_{m+2}$ completes its pre-extensions execution phase and hibernates. In this example, there are no further mappers and the platform short-circuits the extension mapper call.

At time $t_4$, the task engine returns control to mapper $M_{m+2}$, which performs any post-extension operations.

At time $t_5$, mapper $M_{m+2}$ informs the task engine of its completion and the task engine returns control to mapper $M_{m+1}$.

At time $t_0$, mapper $M_{m+1}$ informs the task engine of its completion and the task engine returns control to mapper $M_m$.

At time $t_7$, mapper $M_m$ informs the task engine of its completion, thus concluding the mapping operations for this task.

8. Signaling

In an embodiment, to ensure that mappers can perform their respective operations, the platform includes mechanisms for the mappers to perform one or more of: collaborating within a task; notifying other tasks, mappers, and the platform; returning results to the API caller; generating new tasks as needed; and/or performing outbound calls to systems and data sources (e.g., to implement business processes). In an embodiment, the platform uses signals to initiate the creation of the initial set of start tasks, and to inform the API caller when response information is available.

As used herein, a signal refers to the occurrence of an event that conforms to a specific signal definition. Each event occurrence may include (a) an optional signal payload and (b) mandatory metadata, such as control instructions, to be used when processing the signal occurrence in another area of the platform.

8.1. Signal Definitions

In an embodiment, each signal has a corresponding signal definition that includes (a) a signal name and (b) zero or more additional parameters, depending on what kind of signal definition is applied. Signal definitions may be organized according to multiple dimensions:

Signals that support only inter-task/inter-mapper data delivery, versus signals that trigger built-in platform functionality, including but not limited to making outbound service calls.

Signals that can be emitted by mappers multiple times, without mapper interruption, versus signals that have a staging area for their payload and metadata; the latter signals are affiliated with the lifecycle of a task and are emitted as a single event only after the task completes.

Signals that allow free choice of the payload data types, versus signals where the payload type is derived from the nature of the mappers operating on them.

In an embodiment, before mappers can use signal definitions and tasks can transmit instances of signals, they must be registered with the platform. A mapper may also be required to register based on its relationship with signal definitions:

A mapper may be required to specify what kind(s) of signal(s) it might provide.

A mapper may be required to specify what kind(s) of signal(s) result in the creation of new tasks, based on this mapper (and optionally any companion extension mappers). To this end, a base type-mapper may be required to provide the capability to determine what mapper stack(s) should be built for from-model and/or to-model processing. From-model and to-model processing are discussed in further detail herein.

One or more embodiments may also register signal definitions for shared non-mapper-related operations.

8.2. Creating Tasks from Signals

In an embodiment, when a base type-mapper has subscribed to a signal definition, occurrences of the signal trigger the creation of new tasks. Before a task commences, it may first need to be initialized with the stack of mappers used in the task. For this to happen, the platform may perform different variants of the same strategy for from-model and to-model type-mappers.

8.2.1. Creating a Mapper Stack for from-Model Tasks

In the case of from-model task creation, the signal payload may include a discriminator field (e.g., as described in the OpenAPI 3.0.x specification) or a similar source. As each mapper is registered with the platform with information that indicates which base or extension type it handles, the platform can deterministically derive the stack of mappers for the signal payload item. For example, using the example data model of FIG. 2, the platform would be able to derive, for a given person object, whether it is a base person, an engineer, or one of the extended engineer types.

FIG. 8 illustrates an example of a mapper execution stack in accordance with one or more embodiments. Components and/or operations described below should be understood as one specific example which may not be applicable to certain embodiments. Accordingly, components and/or operations described below should not be construed as limiting the scope of any of the claims.

Specifically, FIG. 8 continues the example above of deriving a mapper execution stack 800 for a signal payload item. In this example, the payload item corresponds to a mechanical engineer object. Thus, the mapper execution stack 800 includes the base person mapper 802, augmentation person mapper 804 (if available), base engineer mapper 806, augmentation engineer mapper 808 (if available), and base mechanical engineer mapper 810. In this example, there is no augmentation mechanical engineer mapper. In this example, the SaaS provider owns the base person mapper 804 and the base engineer mapper 806. The base mechanical engineer mapper 810 is a tenant-specific extension.

Because signals produced by from-model tasks include arbitrary data, the signal data type is unbounded.

8.2.2. Creating a Mapper Stack for to-Model Tasks

In an embodiment, for to-model tasks, the inbound signal payload is unbounded and the target model is the domain model of the API. Here, the mapper stack may differ from the mapper stack for a from-model task in certain ways:

The platform cannot infer the effective target type without guidance from the base mapper. To this end, the base mapper may include a function that maps the signal's payload and metadata to the target type selector before the actual mapping. A root-type base mapper may not be able to prescribe the criteria for deriving the mapper stack. Accordingly, it may instruct the platform to determine, based on the optional augmentation mapper, which target type to infer. The augmentation mapper may return the identified target type. Alternatively, the augmentation mapper may waive the decision, in which case the base type may be inferred as a fallback target type.

The platform does not allow for selecting the resulting data model for task signals that are created by the to-model mapper stack, because the data model is based on the derived target type that resulted in the composition of the mapper stack.

8.3. Using Signals for Collaboration

8.3.1. Emission and Subscription

In an embodiment, mappers may emit signals on an ad hoc basis and/or as task signals in combination with peer mappers operating on the same task. Mappers may fire ad hoc or "active" signals asynchronously, at any time and as many times as needed. Because ad hoc signals are emitted immediately, they do not allow extension mappers to augment the signal payload or metadata. In contrast, task signals have an in-staging nature while the task is running, and are emitted after all mappers are completed.

In strongly typed programming languages (e.g., Java, C #, etc.), active signal emission may be implemented to accept an instance of the payload type to emit. However, task signals in such languages may require an object factory to be specified as part of the task signal definition; the object factory generates the task signal work item based on the effective target type.

As discussed herein, mappers may subscribe to signal definitions, in order to spawn new tasks responsive to signal occurrences.

8.3.2. Reactive Await of Signals and Signal Collections

In an embodiment, running mappers may depend on the occurrence of signals in the same or other tasks, allowing them to start in parallel with other tasks and reactively go to sleep, waking up again once the expected signals are available. A mapper may declare a dependency on a particular signal and/or a collection of occurrences of the same signal. Signal occurrences may arise before or after the in-processing dependency declaration. In some instances, for a given collection of signals, the signal may have already occurred on some tasks and could still occur on other tasks in the future. One or more embodiments use techniques described below to determine whether a signal is still reachable.

In some cases, a mapper may determine that processing of awaited signals is not relevant to the processing of other mappers within the same mapper stack. Accordingly, the mapper may logically detach from the regular mapper stack traversal discussed above; this detachment may include opting out of being woken up by the mapper manager after the extension completes. In embodiments that use multi-threading, this approach may result in the parallel processing of other mappers in the mapper stack and application of the awaited signal. Detached mappers may be required to actively confirm their completion, which may occur after all other mappers in the mapper stack have completed operations.

8.3.3. Reference State Machine for Mappers

Figure 9:
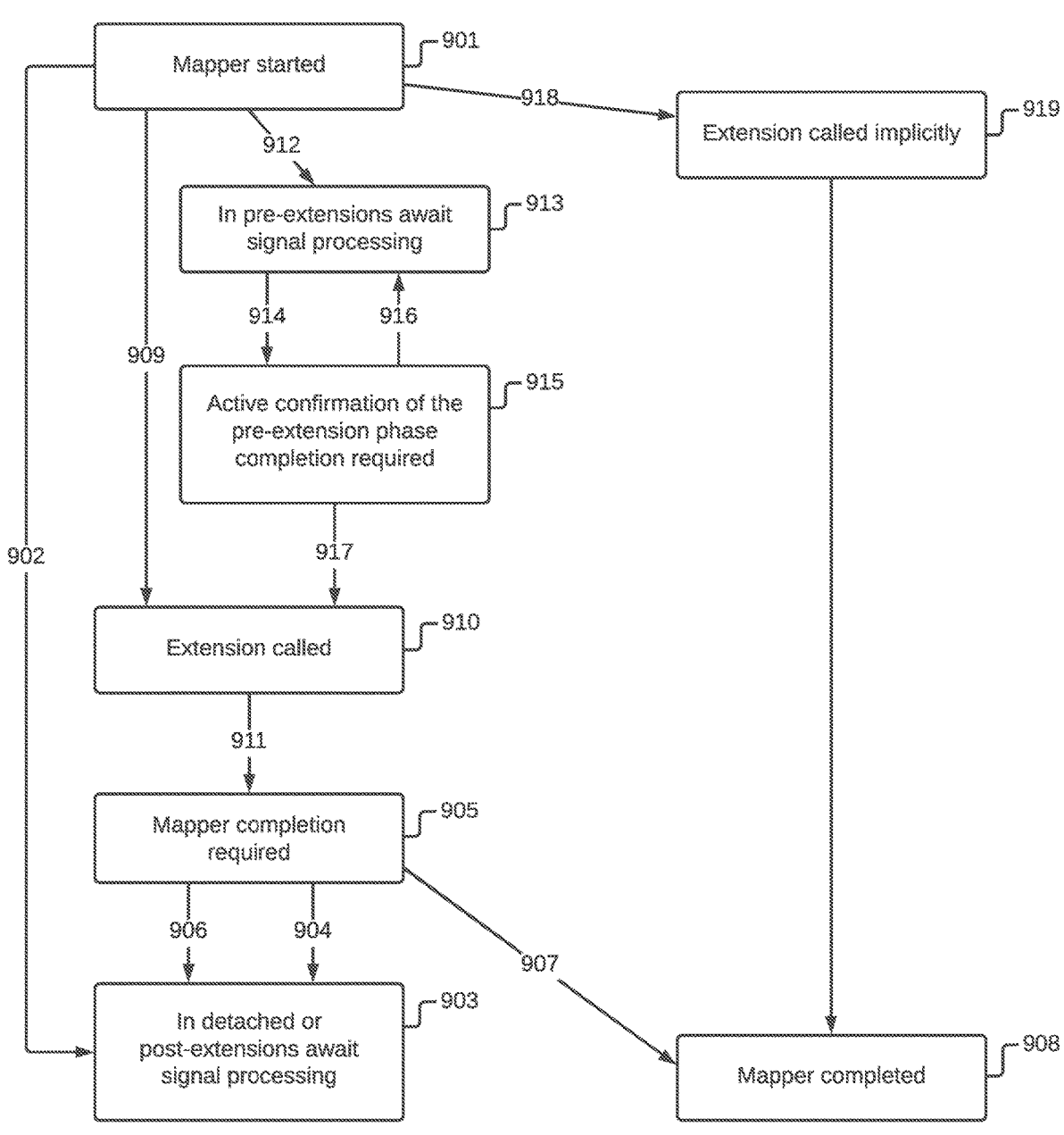
FIG. 9 illustrates an example of a reference state machine for mappers in accordance with one or more embodiments.

FIG. 9 illustrates an example of a reference state machine for mappers in accordance with one or more embodiments. Components and/or operations described below should be understood as one specific example which may not be applicable to certain embodiments. Accordingly, components and/or operations described below should not be construed as limiting the scope of any of the claims. For example, additional states may exist to cover error conditions.

In the following discussion, a mapper may be in one of the following states:

1. State 901: The mapper has been started by the mapper manager.
2. State 903: The mapper is detached or in post-extensions phase and awaits signal processing. At any given point in time, only one await signal (singular or collection) is allowed to be active. Accordingly, before the next call to await signal (singular or collection), the signal must be delivered.
3. State 905: Mapper completion is required. The extension mappers have completed their state machines or have detached, and flow control is back with the current mapper. Alternatively, the mapper called await signal (singular or collection), detaching from the regular mapper stack execution.
4. State 908: Mapper completed. The mapper has (a) actively confirmed its completion or (b) has not confirmed its pre-extension completion and has not awaited a signal.
5. State 910: Extension called. The mapper's pre-extension phase is complete and the mapper manager starts the next mapper's state machine.
6. State 913: The mapper is in pre-extensions phase, awaiting signal processing. At any given point in time, only one await signal (singular or collection) is allowed to be active. Accordingly, before the next call to await signal (singular or collection), the signal must be delivered.
7. State 915: Active confirmation of pre-extension phase completion is required. The mapper has indicated that it will determine, for itself, when to call into the next base or extension type-mapper (if one exists).

8. State 919: An extension is called implicitly. The mapper manager implicitly calls the extension mapper(s) and the current mapper is transitioning to completion.

In an embodiment, when the mapper manager triggers execution of the mapper, the state machine starts in State 901. From here, four or more possible paths may be available:

1. The mapper may detach from the regular mapper stack execution and request the mapper manager to wake it up, after the awaited signal is available (Path 902). At this point, the mapper may wait in State 903 for the signal to occur (Path 904). Alternatively, if the signal or signal collection is already available, the mapper may immediately transition to State 905. From State 905, the mapper may await further signals and return to waiting State 903 (Path 906). Alternatively, the mapper may confirm its completion (Path 907) and move to completed State 908.
2. The mapper may optionally perform actions that do not affect the state machine, such as emitting active signals and/or working on staged task signals. The mapper may then confirm the completion of the pre-extension processing phase (Path 909). The mapper may then call the next extension mapper (if applicable) while the current mapper waits in State 910. If no more extension mappers exist and/or all extension mappers have completed or detached, the mapper manager initiates the post-execution phase of the mapper (Path 911) and the mapper transitions to State 905, discussed above.
3. The mapper may await a signal or signal collection before the next mapper gets called (Path 912). In this case, unless the signal data is already present, the mapper hibernates in State 913 and awaits signal delivery by the signal engine and mapper manager (Path 914). In State 913, at any given point in time, only one await signal is allowed to be active at one time; accordingly, before the next call to the await signal, the signal must first be delivered. On signal delivery, the mapper transitions to State 915, from which it may await the next signal (Path 916) and then return to State 913. Alternatively, the mapper may confirm that it has completed the pre-extension processing (Path 917) and transition to State 910, discussed above.
4. The mapper may only perform activities that do not alter the mapper state out of active processing. As discussed above, such processing may include, for example, the emission of active signals and/or working on task signal stage data. If the mapper manager detects that the mapper is still in State 901 after returning the flow control (Path 918), as there is no post-extension processing registered by the mapper, the mapper may be moved to intermediate State 919 for reporting of implicit completion and to perform mapper detachment from the regular mapper stack execution. The mapper then transitions to the completed State 908.

8.4. Signal Reachability

8.4.1. Transitive Reachability

In an embodiment, signals may be registered as being provided from outside of the task engine (e.g., the initial task set), provided by the platform, and/or provided by mappers (e.g., base and extension mappers). Mappers may subscribe to signals, to trigger the creation of new tasks from selective signals. Thus, signals may be transitively reachable via chained tasks, as long as the tasks have not yet completed.

Figure 10:
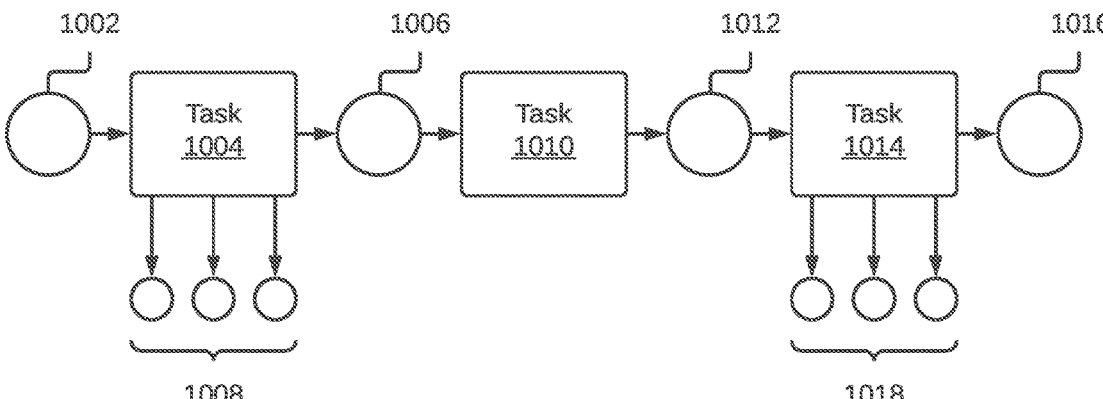
FIGS. 10 and 11 illustrate examples of signal reachability in accordance with one or more embodiments.
Figure 11:
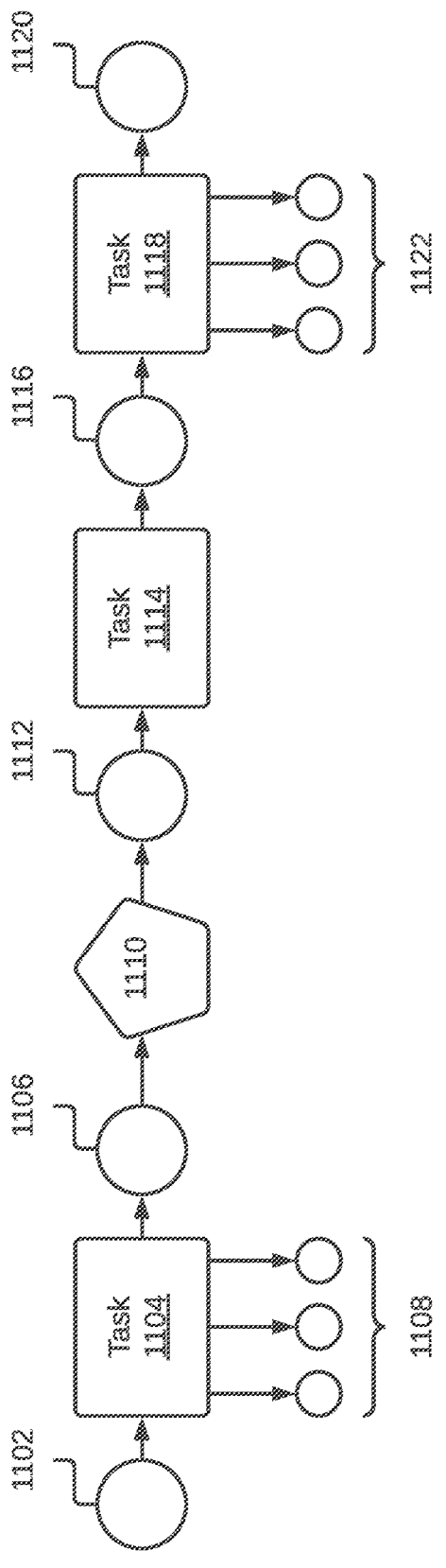

FIGS. 10 and 11 illustrate examples of signal reachability in accordance with one or more embodiments. Components and/or operations described below should be understood as one specific example which may not be applicable to certain embodiments. Accordingly, components and/or operations described below should not be construed as limiting the scope of any of the claims.

Specifically, in FIG. 10, a trigger signal 1002 triggers creation of a task 1004, which may spawn an outcome signal 1006 and/or other task signals 1008. The next task 1010 in the chain generates another outcome signal 1012, which triggers creation of another task 1014. This task 1014 also generates an outcome signal 1016 and/or other task signals 1018.

In this example, regardless of the signal definitions, as long as any of tasks 1004, 1008, 1014 are still running (and regardless of whether successor tasks have been spawned yet), the final outcome signal 1016 is considered reachable. In an embodiment, as long as a signal is reachable, a waiter for signal occurrences must not be woken up.

Similarly, in FIG. 11, a trigger signal 1102 triggers creation of a task 1104, which may spawn an outcome signal 1106 and/or other task signals 1108. In this example, the signal-to-network interface 1110 receives the outcome signal 1106, calls an external service, and upon completion, generates a reply signal 1112. The reply signal 1112 triggers creation of another task 1114, which in turn emits an outcome signal 1116 that triggers creation of yet another task 1118. This task also generates an outcome signal 1120 and/or other task signals 1122. As in the example above, signals down the chain are considered transitively reachable as long as any of the preceding tasks are running.

8.4.2. Determining Signal Reachability

Figure 12:
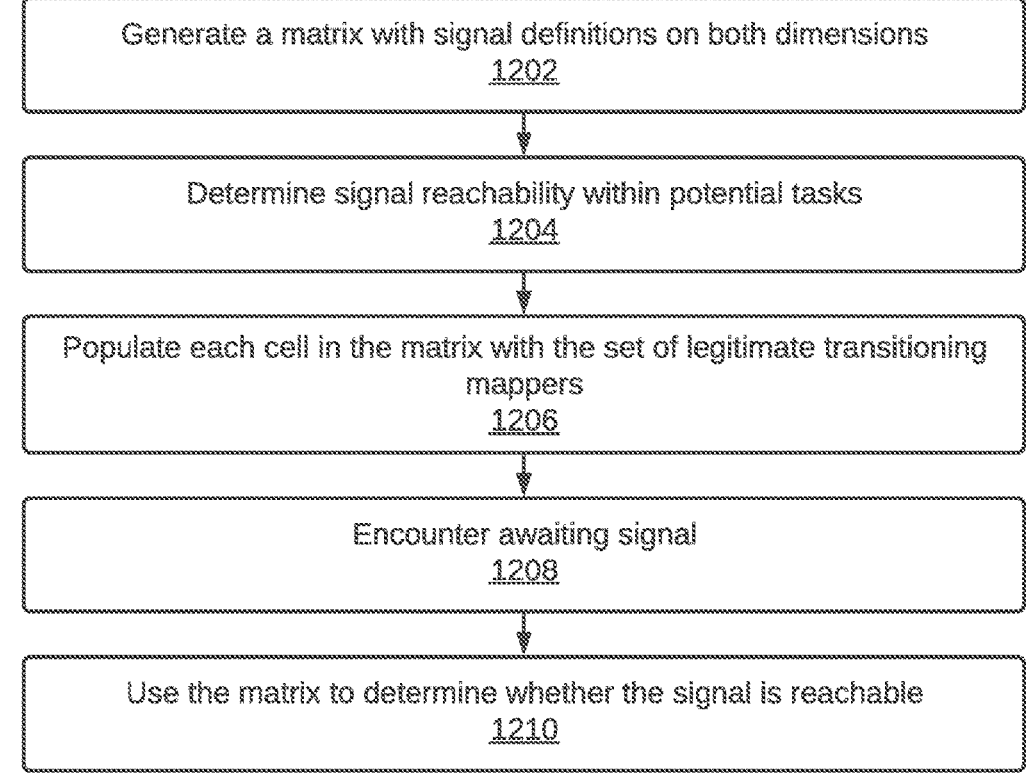
FIG. 12 illustrates an example set of operations for determining signal reachability in accordance with one or more embodiments.

FIG. 12 illustrates an example set of operations for determining signal reachability in accordance with one or more embodiments. One or more operations illustrated in FIG. 12 may be modified, rearranged, or omitted all together. Accordingly, the particular sequence of operations illustrated in FIG. 12 should not be construed as limiting the scope of one or more embodiments. In the following discussion, the term "platform" refers to an upgrade-safe, extensible SaaS platform as described herein.

In an embodiment, determining signal reachability uses a modified version of the Floyd-Warshall algorithm. Typically, the Floyd-Warshall algorithm determines the reachability of nodes via their directed connecting edges. For example, given A→B and B→C, the algorithm determines that A→C implicitly, based on the two given transitions. Thus, the algorithm computes the transitive closure. Specifically, the algorithm uses a matrix representation with the states (A, B, and C in the preceding example) on both dimensions and the matrix cell being set to "true" wherever a connecting edge exists. The algorithm then uses an iterative approach to set further cells to "true" where transitive reachability is determined.

In an embodiment, the platform generates a matrix with signal definitions on both dimensions (Operation 1202). In this configuration, the cell values correspond to the sets of mappers that are legitimate sources of transitions between those signals. Mappers within a task are additive, and each mapper can declare its additional provided signals.

In an embodiment, the platform determines signal reachability within each potential task (Operation 1204). To determine signal reachability within each potential task, the platform may traverse the type graph of each type (e.g., as in the example type hierarchies of company and person types, discussed above). For each potential type, the platform determines the applicable mapper stack. Signals provided by mappers lower in the stack are considered to potentially also be emitted by more specialized (i.e., "higher") mappers in the stack.

For example, the mapper of the company type may declare that it provides signal A. and the mapper for the private company type may declare that it provides signal B. In this case, the platform determines that the mapper for the private company type is a valid source of {A, B}. As an optimization, all mappers that do not declare additional provided signals may be eliminated from the reachability graph.

In an embodiment, the platform populates each cell in the matrix with the corresponding set of legitimate transitioning mappers (Operation 1206). Specifically, the platform may iterate over the initial matrix, in a manner similar to the Floyd-Warshall algorithm, and merge the existing set values in the cells with newly discovered values over the course of the iterations.

When the platform encounters an awaited signal (Operation 1208) while processing tasks, the platform uses the matrix to determine whether the signal is currently reachable (Operation 1210). Specifically, given the set of all mappers for all active tasks and those completed tasks where outcome task signals are still in processing, if any one of the mappers is a valid transitive source of the awaited signal, then the signal is still reachable.

8.4.3. Signal Scope

In an embodiment, determining signal reachability (e.g., as described above) allows the platform to determine whether a given signal may still be fired. In addition, in some cases, it is important to determine whether a signal is still reachable in the context of a specific task. For example, each person may have a different home address. In this example, when a mapper that is transforming records of type person is waiting for the transformation result of the person's address, it does so in the context of a specific person, not across all persons. To support this, the platform may support emitting signals in scopes and sub-scopes.

Figure 13:
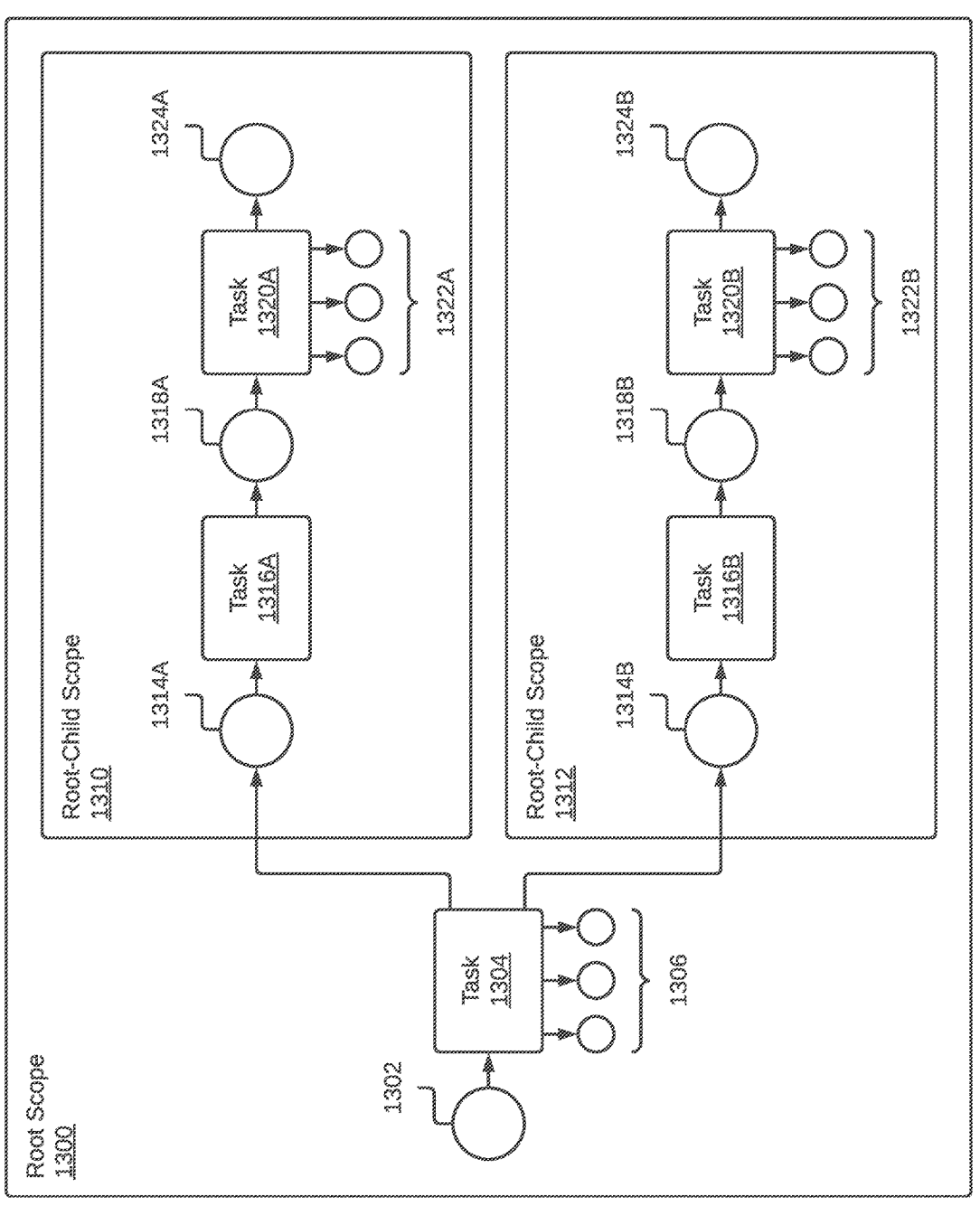
FIG. 13 illustrates an example of signal scope in accordance with one or more embodiments.

FIG. 13 illustrates an example of signal scope in accordance with one or more embodiments. Components and/or operations described below should be understood as one specific example which may not be applicable to certain embodiments. Accordingly, components and/or operations described below should not be construed as limiting the scope of any of the claims. In the example illustrated in FIG. 13, two levels of scope are shown. In an embodiment, the platform supports an arbitrary number of recursively-created sub-scopes.

Specifically, as illustrated in FIG. 13, a trigger signal 1302 triggers creation of a task 1304 within a root scope 1300. The task 1304 emits two instances of outcome signals 1314A, 1314B in respective root-child scopes 1310, 1312. The task 1304 may also emit other task signals 1306. Within the root-child scopes 1310, 1312, the outcome signals 1314A, 1314B trigger the creation of respective tasks 1316A, 1316B, which in turn emit outcome signals 1318A, 1318B. These outcome signals 1318A, 1318B trigger the creation of respective tasks 1320A, 1320B, which may emit outcome signals 1324A, 1324B and/or other task signals 1322A, 1322B.

In the example of FIG. 12, awaiting the outcome signals 1324A, 1324B in the root scope 1300 must be a collection await. Within each of the root-child scopes 1310, 1312, the respective outcome signals 1324A, 1324B can be awaited as single occurrences.

9. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service, such as execution of a particular application and/or storage of a particular amount of data). A server process responds by, for example, executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, or a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network, such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

A client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (for example, a web browser), a program interface, or an application programming interface (API).

In one or more embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In one or more embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

A computer network may implement various deployment, including but not limited to a private cloud, a public cloud, and/or a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof may be accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In one or more embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In a multi-tenant computer network, tenant isolation may be implemented to ensure that the applications and/or data of different tenants are not shared with each other. Various tenant isolation approaches may be used. Each tenant may be associated with a tenant identifier (ID). Each network resource of the multi-tenant computer network may be tagged with a tenant ID. A tenant may be permitted access to a particular network resource only if the tenant and the particular network resources are associated with the same tenant ID.

For example, each application implemented by the computer network may be tagged with a tenant ID, and tenant may be permitted access to a particular application only if the tenant and the particular application are associated with a same tenant ID. Each data structure and/or dataset stored by the computer network may be tagged with a tenant ID, and tenant may be permitted access to a particular data structure and/or dataset only if the tenant and the particular data structure and/or dataset are associated with a same tenant ID. Each database implemented by the computer network may be tagged with a tenant ID, and tenant may be permitted access to data of a particular database only if the tenant and the particular database are associated with the same tenant ID. Each entry in a database implemented by a multi-tenant computer network may be tagged with a tenant ID, and a tenant may be permitted access to a particular entry only if the tenant and the particular entry are associated with the same tenant ID. However, the database may be shared by multiple tenants.

In one or more embodiments, a subscription list indicates which tenants have authorization to access which network resources. For each network resource, a list of tenant IDs of tenants authorized to access the network resource may be stored. A tenant may be permitted access to a particular network resource only if the tenant ID of the tenant is included in the subscription list corresponding to the particular network resource.

In one or more embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted only to other devices within the same tenant overlay network. Encapsulation tunnels may be used to prohibit any transmissions from a source device on a tenant overlay network to devices in other tenant overlay networks. Specifically, packets received from the source device may be encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

10. Microservice Applications

In one or more embodiments, techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally include a single logical executable. With microservice applications, different microservices are independently deployable as separate executables. Microservices may communicate using Hypertext Transfer Protocol (HTTP) messages and/or according to other communication protocols via Application Programming Interface (API) endpoints. Microservices may be managed and updated separately, written in different languages, and executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

Microservices may be connected via a GUI. For example, microservices may be displayed as logical blocks within a window, frame, or other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

10.1. Triggers

The techniques described above may be encapsulated into a microservice, according to one or more embodiments. In other words, a microservice may trigger a notification (into the microservices manager for optional use by other plugged-in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects that a value has crossed a triggering threshold.

A trigger, when satisfied, may output data for consumption by the target microservice. Alternatively or additionally, when satisfied, a trigger may output a binary value indicating that the trigger has been satisfied, and/or may output the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

10.2. Actions

A plugged-in microservice application may expose actions to the microservices manager. The exposed actions may receive, as input, data or an identification of a data object or location of data that causes data to be moved into a data cloud.

The exposed actions may receive, as input, a request to increase or decrease existing alert thresholds. The input may identify existing in-application alert thresholds and whether to increase, decrease, or delete the threshold. The input may request the microservice application to create new in-application alert thresholds. The in-application alerts may trigger alerts to the user while logged into the application or may trigger alerts to the user, using default or user-selected alert mechanisms available within the microservice application itself, rather than through other applications plugged into the microservices manager.

The microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

11. Hardware Overview

In one or more embodiments, techniques described herein are implemented by one or more special-purpose computing devices. The special-purpose computing device(s) may be hard-wired to perform the techniques, and/or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, FPGAs, or NPUs with custom programming to accomplish the techniques. A special-purpose computing device may be desktop computer systems, portable computer systems, handheld devices, networking devices, or any other device that incorporates hard-wired and/or program logic to implement the techniques.

Figure 14:
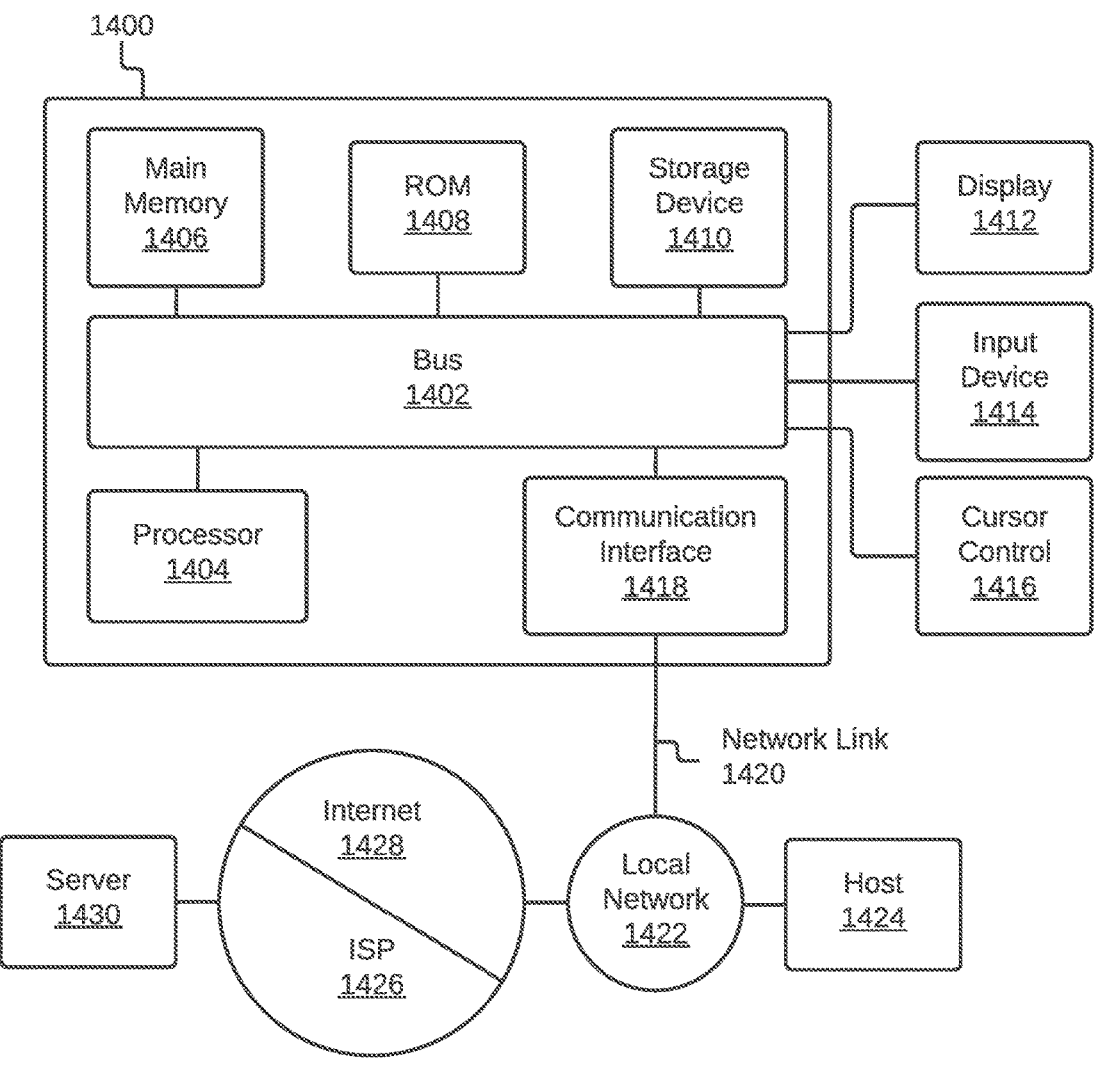
FIG. 14 shows a block diagram that illustrates a computer system in accordance with one or more embodiments.

For example, FIG. 14 is a block diagram that illustrates a computer system 1400 upon which one or more embodiments of the invention may be implemented. The computer system 1400 includes a bus 1402 or other communication mechanism for communicating information, and a hardware processor 1404 coupled with bus 1402 for processing information. The hardware processor 1404 may be, for example, a general-purpose microprocessor.

The computer system 1400 also includes a main memory 1406, such as a random access memory (RAM) or other dynamic storage device, coupled to bus 1402 for storing information and instructions to be executed by processor 1404. The main memory 1406 also may be used for storing temporary variables or other intermediate information during execution of instructions to be executed by processor 1404. Such instructions, when stored in non-transitory storage media accessible to the processor 1404, render the computer system 1400 into a special-purpose machine that is customized to perform the operations specified in the instructions.

The computer system 1400 further includes a read only memory (ROM) 1408 or other static storage device coupled to the bus 1402 for storing static information and instructions for the processor 1404. A storage device 1410, such as a magnetic disk or optical disk, is provided and coupled to the bus 1402 for storing information and instructions.

The computer system 1400 may be coupled via the bus 1402 to a display 1412, such as a cathode ray tube (CRT), for displaying information to a computer user. An input device 1414, including alphanumeric and other keys, is coupled to the bus 1402 for communicating information and command selections to the processor 1404. Another type of user input device is cursor control 1416, such as a mouse, a trackball, or cursor direction keys for communicating direction information and command selections to the processor 1404 and for controlling cursor movement on the display 1412. This input device typically has two degrees of freedom in two axes, a first axis (e.g., x) and a second axis (e.g., y), that allows the device to specify positions in a plane.

The computer system 1400 may implement techniques described herein using customized hard-wired logic, one or more ASICs or FPGAs, firmware, and/or program logic which in combination with the computer system 1400 causes or programs the computer system 1400 to be a special-purpose machine. In one or more embodiments, the techniques herein are performed by the computer system 1400 in response to the processor 1404 executing one or more sequences of one or more instructions contained in the main memory 1406. Such instructions may be read into the main memory 1406 from another storage medium, such as the storage device 1410. Execution of the sequences of instructions contained in the main memory 1406 causes the processor 1404 to perform the process steps described herein. Alternatively, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as storage device 1410. Volatile media includes dynamic memory, such as the main memory 1406. Common forms of storage media include, for example, a floppy disk, a flexible disk, hard disk, solid state drive, magnetic tape, or any other magnetic data storage medium, a read-only compact disc (CD-ROM), any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires of the bus 1402. Transmission media can also take the form of acoustic or light waves, such as those generated during radio frequency (RF) and infrared data communications.

Various forms of media may be involved in carrying one or more sequences of one or more instructions to the processor 1404 for execution. For example, the instructions may initially be carried on a magnetic disk or solid-state drive of a remote computer. The remote computer can load the instructions into its dynamic memory and send the instructions over a telephone line or other communications medium, using a modem. A modem local to the computer system 1400 can receive the data on the telephone line or other communications medium and use an infrared transmitter to convert the data to an infrared signal. An infrared detector can receive the data carried in the infrared signal and appropriate circuitry can place the data on the bus 1402. The bus 1402 carries the data to the main memory 1406, from which the processor 1404 retrieves and executes the instructions. The instructions received by the main memory 1406 may optionally be stored on the storage device 1410, either before or after execution by processor 1404.

The computer system 1400 also includes a communication interface 1418 coupled to the bus 1402. The communication interface 1418 provides a two-way data communication coupling to a network link 1420 that is connected to a local network 1422. For example, the communication interface 1418 may be an integrated services digital network (ISDN) card, cable modem, satellite modem, or a modem to provide a data communication connection to a corresponding type of telephone line. As another example, the communication interface 1418 may be a local area network (LAN) card configured to provide a data communication connection to a compatible LAN. Wireless links may also be implemented. In any such implementation, the communication interface 1418 sends and receives electrical, electromagnetic, or optical signals that carry digital data streams representing various types of information.

The network link 1420 typically provides data communication through one or more networks to other data devices. For example, the network link 1420 may provide a connection through a local network 1422 to a host computer 1424 or to data equipment operated by an Internet Service Provider (ISP) 1426. The ISP 1426 in turn provides data communication services through the world wide packet data communication network now commonly referred to as the "Internet" 1428. The local network 1422 and Internet 1428 both use electrical, electromagnetic, or optical signals that carry digital data streams. The signals through the various networks and the signals on the network link 1420 and through the communication interface 1418, which carry the digital data to and from the computer system 1400, are example forms of transmission media.

The computer system 1400 can send messages and receive data, including program code, through the network(s), network link 1420, and communication interface 1418. In the Internet example, a server 1430 might transmit a requested code for an application program through the Internet 1428, ISP 1426, local network 1422, and communication interface 1418.

The received code may be executed by processor 1404 as it is received, and/or may be stored in the storage device 1410 or other non-volatile storage for later execution.

12. Miscellaneous; Extensions

Embodiments are directed to a system with one or more devices that include a hardware processor and that are configured to perform any of the operations described herein and/or recited in any of the claims below.

In one or more embodiments, a non-transitory computer-readable storage medium stores instructions which, when executed by one or more hardware processors, cause performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors, cause performance of operations comprising:

receiving, by a software-as-a-service (SaaS) platform, an application programming interface (API) request associated with a tenant of the SaaS platform;

determining, by the SaaS platform, that the API request comprises a first object type, wherein the first object type is a tenant-specific type that extends a built-in type of the SaaS platform;

responsive to determining that the API request comprises the first object type: executing, by the SaaS platform, a first mapper stack comprising at least (a) a first type-mapper associated with the built-in type of the SaaS platform and (b) a second type-mapper associated with the tenant-specific type that extends the built-in type;

controlling, by the SaaS platform, execution of the first mapper stack using a plurality of signals emitted respectively by each mapper in the first mapper stack;

determining, by the SaaS platform, that a signal in the plurality of signals is transitively reachable;

responsive to determining that the signal is transitively reachable: refraining, by the SaaS platform, from waking a process that is waiting for completion of the signal;

transmitting, by the SaaS platform, output of the first mapper stack in response to the API request.

2. The one or more non-transitory computer-readable media of claim 1, wherein the first mapper stack further comprises an augmentation type-mapper comprising one or more tenant-specific augmentations of the first type-mapper.

3. The one or more non-transitory computer-readable media of claim 1, wherein executing the first mapper stack comprises:

executing a first operation of the first type-mapper;

transferring control to the second type-mapper;

after transferring control to the second type-mapper: executing a second operation of the second type-mapper;

returning control to the first type-mapper;

after returning control to the first type-mapper: executing a third operation of the first type-mapper.

4. The one or more non-transitory computer-readable media of claim 1, the operations further comprising:

decomposing, by the SaaS platform, a payload associated with the API request to determine that the payload comprises a plurality of object types, wherein the first object type is one of the plurality of object types;

determining, by the SaaS platform, that the API request comprises a second object type in the plurality of object types;

responsive to determining that the API request comprises the second object type: executing, by the SaaS platform, a second mapper stack;

transmitting, by the SaaS platform, output of the second mapper stack in response to the API request.

5. The one or more non-transitory computer-readable media of claim 1, wherein determining that the signal is transitively reachable comprises:

generating, by the SaaS platform, a matrix that indicates which signals are reachable for each task in a plurality of potential tasks;

determining, based at least on the matrix, that the signal is reachable for an active task.

6. The one or more non-transitory computer-readable media of claim 1, wherein determining that the signal is transitively reachable is performed relative to a task scope that is a subset of a root task scope managed by the SaaS platform.

7. A system comprising:

one or more hardware processors;

one or more non-transitory computer-readable media; and program instructions stored on the one or more non-transitory computer-readable media which, when executed by the one or more hardware processors, cause the system to perform operations comprising:

receiving, by a software-as-a-service (SaaS) platform, an application programming interface (API) request associated with a tenant of the SaaS platform;

determining, by the SaaS platform, that the API request comprises a first object type, wherein the first object type is a tenant-specific type that extends a built-in type of the SaaS platform;

responsive to determining that the API request comprises the first object type: executing, by the SaaS platform, a first mapper stack comprising at least (a) a first type-mapper associated with the built-in type of the SaaS platform and (b) a second type-mapper associated with the tenant-specific type that extends the built-in type;

controlling, by the SaaS platform, execution of the first mapper stack using a plurality of signals emitted respectively by each mapper in the first mapper stack;

determining, by the SaaS platform, that a signal in the plurality of signals is transitively reachable;

responsive to determining that the signal is transitively reachable: refraining, by the SaaS platform, from waking a process that is waiting for completion of the signal;

transmitting, by the SaaS platform, output of the first mapper stack in response to the API request.

8. The system of claim 7, wherein the first mapper stack further comprises an augmentation type-mapper comprising one or more tenant-specific augmentations of the first type-mapper.

9. The system of claim 7, wherein executing the first mapper stack comprises:

executing a first operation of the first type-mapper;

transferring control to the second type-mapper;

after transferring control to the second type-mapper: executing a second operation of the second type-mapper;

returning control to the first type-mapper;

after returning control to the first type-mapper: executing a third operation of the first type-mapper.

10. The system of claim 7, the operations further comprising:

decomposing, by the SaaS platform, a payload associated with the API request to determine that the payload comprises a plurality of object types, wherein the first object type is one of the plurality of object types;

determining, by the SaaS platform, that the API request comprises a second object type in the plurality of object types;

responsive to determining that the API request comprises the second object type: executing, by the SaaS platform, a second mapper stack;

transmitting, by the SaaS platform, output of the second mapper stack in response to the API request.

11. The system of claim 7, wherein determining that the signal is transitively reachable comprises:

generating, by the SaaS platform, a matrix that indicates which signals are reachable for each task in a plurality of potential tasks;

determining, based at least on the matrix, that the signal is reachable for an active task.

12. The system of claim 7, wherein determining that the signal is transitively reachable is performed relative to a task scope that is a subset of a root task scope managed by the SaaS platform.

13. A method comprising:

receiving, by a software-as-a-service (SaaS) platform, an application programming interface (API) request associated with a tenant of the SaaS platform;

determining, by the SaaS platform, that the API request comprises a first object type, wherein the first object type is a tenant-specific type that extends a built-in type of the SaaS platform;

responsive to determining that the API request comprises the first object type: executing, by the SaaS platform, a first mapper stack comprising at least (a) a first type-mapper associated with the built-in type of the SaaS platform and (b) a second type-mapper associated with the tenant-specific type that extends the built-in type;

controlling, by the SaaS platform, execution of the first mapper stack using a plurality of signals emitted respectively by each mapper in the first mapper stack;

determining, by the SaaS platform, that a signal in the plurality of signals is transitively reachable;

responsive to determining that the signal is transitively reachable: refraining, by the SaaS platform, from waking a process that is waiting for completion of the signal;

transmitting, by the SaaS platform, output of the first mapper stack in response to the API request;

wherein the method is performed by at least one device including a hardware processor.

14. The method of claim 13, wherein executing the first mapper stack comprises:

executing a first operation of the first type-mapper;

transferring control to the second type-mapper;

after transferring control to the second type-mapper: executing a second operation of the second type-mapper;

returning control to the first type-mapper;

after returning control to the first type-mapper: executing a third operation of the first type-mapper.

15. The method of claim 13, further comprising:

decomposing, by the SaaS platform, a payload associated with the API request to determine that the payload comprises a plurality of object types, wherein the first object type is one of the plurality of object types;

determining, by the SaaS platform, that the API request comprises a second object type in the plurality of object types;

responsive to determining that the API request comprises the second object type: executing, by the SaaS platform, a second mapper stack;

transmitting, by the SaaS platform, output of the second mapper stack in response to the API request.

16. The method of claim 13, wherein determining that the signal is transitively reachable comprises:

generating, by the SaaS platform, a matrix that indicates which signals are reachable for each task in a plurality of potential tasks;

determining, based at least on the matrix, that the signal is reachable for an active task.

17. The method of claim 13, wherein determining that the signal is transitively reachable is performed relative to a task scope that is a subset of a root task scope managed by the SaaS platform.

\* \* \* \* \*